July 12, 1932. I. L. TENNEY 1,866,585
MAKING ENDLESS RECORD BANDS
Filed Oct. 22, 1931
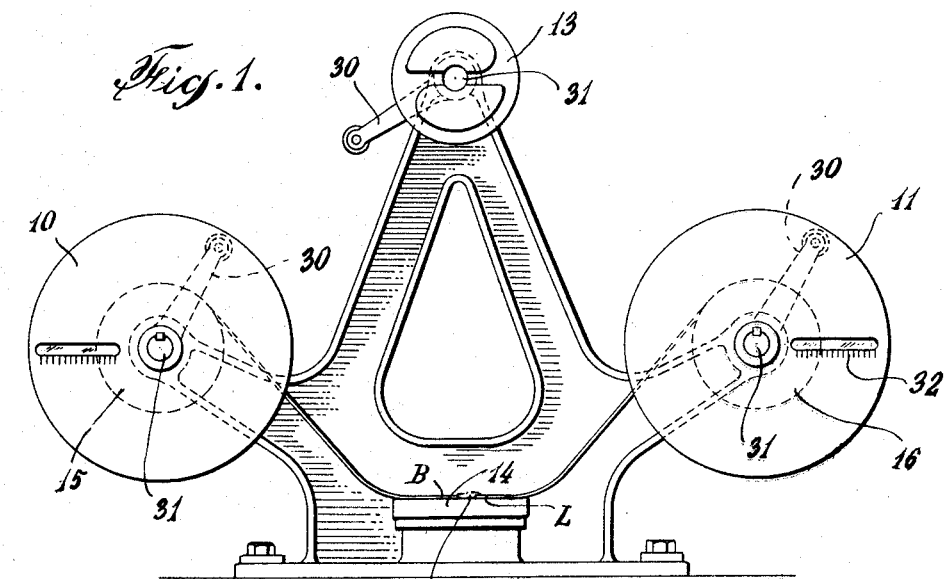
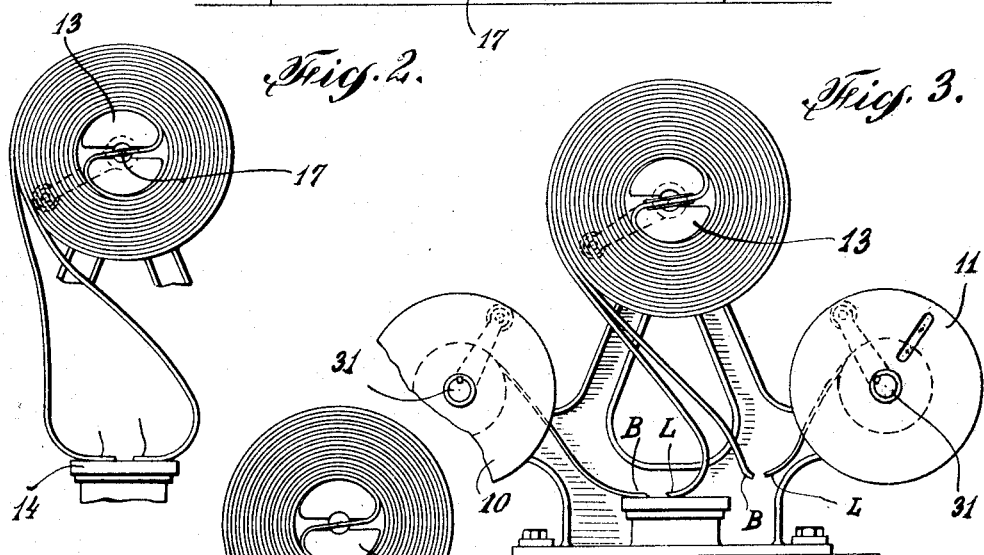
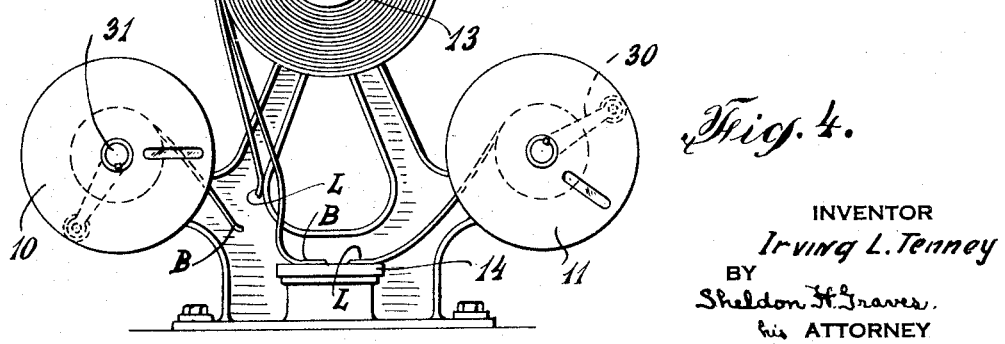
INVENTOR
*Irving L. Tenney*
BY
*Sheldon H. Graves,*
his ATTORNEY Patented July 12, 1932

1,866,585

UNITED STATES PATENT OFFICE

IRVING L. TENNEY, OF NEW YORK, N. Y.

MAKING ENDLESS RECORD BANDS

Application filed October 22, 1931. Serial No. 570,316.

This invention relates to the production of endless bands and consists in an improved method of manipulation whereby a plurality of relatively long bands may be spliced or secured to one another, end to end, so as to form an endless band.

While my invention may be applied to a number of uses it is particularly adapted for the production of endless motion picture films where the film is run repeatedly and continuously through the projecting apparatus without the interruption now made necessary by a change of film or the switching from one projecting apparatus to another.

In my co-pending application Serial Number 553,558, filed July 28, 1931, I disclose an improved winding device adapted for the feeding of an endless strip of film continuously through a sound or picture recording or reproducing apparatus and in this device I make use of a plurality of mandrels or reels upon which the endless film is wound, doubled on itself, the film being alternately wound on and unwound from the outside of each reel or mandrel. My present method is particularly adapted for reproducing a reel of endless film wound in this manner and one which may be readily mounted in the winding device disclosed in said application.

Other objects of my invention will appear from the following description taken in connection with the accompanying drawing wherein:

Figure 1 is a diagrammatic view of a supporting structure employed for connecting together two ends of separate films and subsequently winding the joined film, doubled on itself, upon a mandrel;

Figure 2 is a diagrammatic view of the same film wound on the mandrel with the opposite ends in position to be joined to one another thus forming an endless film composed of two separate films joined together at both ends;

Figure 3 is a view similar to Figure 1 but illustrating the manner in which any greater even number of separate strips may be joined to form an endless band, and Figure 4 is a view similar to Figure 1 but illustrating one method by which any odd number of strips may be joined together.

Referring more particularly to Figure 1 of the drawing 10 and 11 are reels upon which the film or other strip may be wound and 13 is a rotary mandrel comprising two spaced lugs between which a stretch of the film may be passed and upon which the film may be wound doubled on itself as shown, for example in Figure 2, the mandrel 13 forming a third reel for the film.

Conveniently located with respect to the reels is a suitable support or block 14 of any appropriate construction upon which the free ends of the films may be spliced or otherwise joined to one another.

In using the apparatus shown in Figure 1 for forming an endless band from two separate films or strips, one of the films, for example film 15, is wound on the reel 10 and the other, film 16 wound reversely on reel 11 so that the beginning of the record on strip 15 and the end of the record on strip 16 are at the outside of the reels as indicated at B and L respectively.

After winding the films in the manner described the outside ends B and L spliced, cemented or otherwise joined to one another on the support 14. The spliced portion 17, or the portion of the joined film between the reels 10 and 11 is threaded between the lugs of the mandrel or reel 13 and it will be seen that on turning the reel 13 film will be unwound from both the reels 10 and 11 and wound on the reel 13 doubled on itself as indicated in Figure 2. When the separate films on reels 10 and 11 respectively are of equal length the inner ends of the films will be wound off together and may be conveniently spliced on the table 14.

As substantially the entire length of film is supported on the reel 13 the film remains in a compact form and the inconvenient handling of a mass of unwound film is avoided. Should the strips of film originally wound on reels 10 and 11 be of unequal length, after joining the ends B and L the joined film should be unwound from one of the reels 10 and 11 onto the other reel so that approximately equal lengths of film are on the two reels. Then the portion of the film between the two reels may be secured to the reel 13 and the joined film wound on the reel 13. The inner ends on reels 10 and 11 will then be wound off together and may be conveniently spliced. It is to be noted that the inner end on reel 10 will be the last part of the record on strip 15 and the inner end on reel 11 will be the first part of the record on strip 16. Then on joining these inner ends the beginning of the record on one strip will join the last of the record on the other strip.

It is apparent that instead of joining the remaining ends of the films of strips 15 and 16 directly to one another as indicated in Figure 2, these ends may be joined respectively on opposite ends of two additional films wound oppositely on separate reels and the completed film formed of the four strips wound on the reel 13. The remaining ends may then be joined making the whole into an endless band. In this manner any even number of strips may be joined to form an endless belt with the end of the record on one strip joined to the beginning of the record on the next succeeding strip. (Fig. 3).

When it is desired to joint an odd number of strips to form an endless band one strip may be unwound from reel 10 onto reel 11 so that the same amount of film is on each reel. The portion of the film between the reels 10 and 11 is then secured to reel 13 and the film wound on reel 13, doubled on itself. This will bring opposite ends of the film together where they can be spliced or joined respectively of opposite ends of two films wound reversely on the reels 10 and 11, as shown in Figure 4.

Another method of procedure for joining any number of strips to one another is as follows. Assume that the reversely wound strips 15 and 16 of Figure 1 are the first two to be joined, the ends B and L are spliced on the support 14 and strip 15 is then wound off from reel 10 onto reel 11. The outside end of strip 15 is the last of the record on this strip. A third strip of film wound on a suitable reel in the same manner as the strip 15 in Figure 1 that is, with the beginning of the record at the outside has its outer end spliced to the outer end of the film 15 which is now wound on the reel 11. The third film is then wound on the reel 11 so that the reel 11 now holds films 16, 15 and the third film with the last of the record of the third film at the outside of the reel. The outside end may then be joined to the opposite end of yet another film which in turn will be wound on the reel 11.

When the strips have all been joined in this manner, the joined film is unwound from reel 11 onto reel 10 until there are approximately equal lengths of film on the two reels. The portion of the film between the reels is then secured to the mandrel 13 and the entire film unwound from reels 10 and 11 thus bringing out the remaining ends together so that they may be conveniently joined.

It will be noted that the completed strip in each case, is in the form of an endless band of film wound doubled on itself on the mandrel 13. This band may easily be transferred to my improved winding device as disclosed in my said co-pending application which is designed for use with any suitable projecting or reproducing apparatus. For the purpose of transferring the film to my improved winding device the head of the mandrel 13 may be made removable and adapted to be secured to the winding device and there function as one of the winding mandrels. In this way the endless film and its supporting mandrel may be removed as a unit from the present device and inserted in the winding device and a new mandrel head used in the present device.

It will of course be understood that suitable means will be employed for winding the several reels such as cranks 30 secured to the shafts 31 and to which the reels in turn are removably secured and for the purpose of determining approximately the length of the film wound on the reels 10 and 11, I preferably mark the face plates of the reels with graduations 32 located along radical openings in the face plates.

I claim:

1. The method of forming an endless belt of two strips of record film, which consists of winding the strips reversely on separate reels so that the beginning of the record of one strip and the last of the record the other strip are at the outside of their respective reels, joining the outside ends of the strips to one another securing the portion of the film between the reels to a third reel, winding the film from said first mentioned reels onto said third reel, doubled on itself, so that the remaining ends of the strips are at the outside of said third reel and joining together said remaining ends.

2. The method of forming an endless belt of two strips of record film, which consists of winding the strips reversely on separate reels, so that the beginning of the record on one strip and the last of the record on the other strip are at the outside of their respective reels, joining the outside ends to one another, winding the joined film off from one reel and onto the other until both reels carry substantially the same length of film, securing the portion of the film between the reels to a third reel, winding the film from said first mentioned reels onto said third reel, doubled on itself, so that the remaining ends of the strips are at the outside of said third reel and joining together said remaining ends.

3. A method of forming an endless belt of one or more strips of film which comprises unwinding a strip from one reel onto another reel until approximately equal lengths of strip are on the two reels, securing the portion of the strip between the reels to a third reel, unwinding the strip from the first two reels onto the third reel, doubled on itself, whereby opposite ends of the joined strip appear at the outside of the third reel and joining said ends directly to one another.

4. A method of forming an endless belt of one or more record strips, which comprises unwinding a strip from one reel onto another reel until approximately equal lengths of strip are on the two reels, securing the portion of the strip between the reels to a third reel, unwinding the strip from the first two reels onto the third reel, doubled on itself, whereby opposite ends of the joined strip appear at the outside of the third reel and connecting said ends.

5. A method of forming an endless belt of one or more strips of record film, which comprises unwinding a strip from one reel onto another reel until approximately equal lengths of strip are on the two reels, securing the portion of the strip between the reels on a third reel, winding the strip from the first two reels onto the third reel, doubled on itself, whereby opposite ends of the joined strip appear at the outside of the third reel and joining said ends respectively to outside opposite ends of two reversely wound strips.

6. A method of forming an endless belt from a plurality of record strips similarly wound on a plurality of reels which method consists in unwinding one of the strips from its reel onto an additional reel, joining the outside end of the strip to the outside end of another of said strips, unwinding said other strip from its reel onto said additional reel and joining its outside end to the outside end and yet another of said strips and continuing this operation until all of said strips are joined end to end, unwinding the joined strips from said additional reel onto a reel until equal lengths of strip are on said additional and said last named reels, connecting the portion of said joined strip between said last named reels to a reel and winding the strip thereon, doubled on itself, whereby the remaining ends of said joined strip appear at the outside of said last named reel and joining said remaining ends together.

Signed at New York city, in the county of New York and State of New York, this 14th day of October, A. D. 1931.

IRVING L. TENNEY.